United States Patent
Kim et al.

(10) Patent No.: US 10,902,537 B2
(45) Date of Patent: Jan. 26, 2021

(54) METHOD OF PROCESSING LOGISTICS INFORMATION, LOGISTICS INFORMATION PROCESSING SERVER USING THE SAME, AND LOGISTICS MANAGING APPARATUS USING THE SAME

(71) Applicant: ELECTRONICS AND TELECOMMUNICATIONS RESEARCH INSTITUTE, Daejeon (KR)

(72) Inventors: Young Il Kim, Daejeon (KR); Byeong Cheol Choi, Daejeon (KR); Hyo Chan Bang, Daejeon (KR); Geon Min Yeo, Daejeon (KR); Sun Hwa Lim, Daejeon (KR); Dae Geun Park, Daejeon (KR); Soon Yong Song, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 15/820,639

(22) Filed: Nov. 22, 2017

(65) Prior Publication Data

US 2018/0144429 A1    May 24, 2018

(30) Foreign Application Priority Data

Nov. 23, 2016 (KR) .................. 10-2016-0156798
Nov. 16, 2017 (KR) .................. 10-2017-0152856

(51) Int. Cl.
*G06Q 10/00* (2012.01)
*G06Q 50/28* (2012.01)
(Continued)

(52) U.S. Cl.
CPC ......... *G06Q 50/28* (2013.01); *G06Q 10/0635* (2013.01); *G06Q 10/06393* (2013.01);
(Continued)

(58) Field of Classification Search
None
See application file for complete search history.

(56) References Cited

U.S. PATENT DOCUMENTS 9,016,564 B2 * 4/2015 Kim .................. G06Q 10/0838
                                                      235/375
9,650,042 B2 * 5/2017 Sujan .................. G06Q 10/047
(Continued)

FOREIGN PATENT DOCUMENTS

JP         5820135 B      11/2015
KR   10-2013-0082776 A     7/2013
(Continued)

OTHER PUBLICATIONS

Dempsey, Michael, RFID in Ports and Terminals, 2011, A PEMA Information Paper, p. 1-22.*

*Primary Examiner* — Joseph M Waesco
(74) *Attorney, Agent, or Firm* — LRK Patent Law Firm (57) ABSTRACT

A logistics information processing server includes a data processor configured to receive environment sensing data collected from at least one environmental sensor disposed in a cargo storage device in which at least one cargo is stored and cargo related information collected from a cargo tag attached to the at least one cargo, and to perform processing by classifying the environment sensing data and the cargo related data into cargo storage environment data, cargo information, and transportation environment information according to data attributes; and a logistics trust index generator configured to generate a logistics trust index indicating a degree of influence exerted on the quality of the cargo from the cargo storage environment data, cargo infor- (Continued)

mation, and transportation environment information output by the data processor.

17 Claims, 8 Drawing Sheets

(51) Int. Cl.
    *G06Q 10/06*          (2012.01)
    *G06Q 50/30*          (2012.01)
    *G06Q 10/08*          (2012.01)
    *G01D 5/00*           (2006.01)

(52) U.S. Cl.
    CPC .......... *G06Q 10/083* (2013.01); *G06Q 50/30* (2013.01); *G01D 5/00* (2013.01)

(56) References Cited

U.S. PATENT DOCUMENTS

| | | | | |
|---|---|---|---|---|
| 2007/0050312 A1* | 3/2007 | Park | .............. | G06Q 10/08 705/402 |
| 2013/0087610 A1* | 4/2013 | Shin | .............. | G06Q 10/08 235/375 |
| 2015/0154557 A1* | 6/2015 | Skaaksrud | .............. | G05D 1/021 705/337 |
| 2016/0042321 A1* | 2/2016 | Held | .............. | G06Q 10/0838 705/338 |
| 2016/0048709 A1* | 2/2016 | Butler | .............. | H01Q 1/38 340/10.51 |
| 2016/0048712 A1* | 2/2016 | Butler | .............. | H01Q 1/38 340/10.51 |
| 2016/0217381 A1* | 7/2016 | Bloomquist | .............. | G06N 5/046 |
| 2016/0314327 A1* | 10/2016 | Butler | .............. | H01Q 1/2225 |
| 2016/0358084 A1* | 12/2016 | Bloomquist | .............. | G06N 5/046 |
| 2017/0024988 A1* | 1/2017 | Benson | .............. | H04N 7/181 |
| 2017/0061174 A1* | 3/2017 | Butler | .............. | H04L 67/04 |
| 2017/0270323 A1* | 9/2017 | Butler | .............. | G06K 7/10198 |
| 2017/0313269 A1* | 11/2017 | Breed | .............. | B60R 21/01526 |
| 2017/0344939 A1* | 11/2017 | Linton | .............. | G01S 19/46 |
| 2017/0347333 A1* | 11/2017 | Skaaksrud | .............. | G06Q 10/0836 |
| 2017/0353943 A1* | 12/2017 | Skaaksrud | .............. | G06Q 10/083 |
| 2018/0052218 A1* | 2/2018 | Meadow | .............. | G01S 5/10 |
| 2018/0088206 A1* | 3/2018 | Meadow | .............. | G01S 5/10 |
| 2018/0197135 A1* | 7/2018 | Moyer | .............. | G06Q 50/10 |
| 2018/0204029 A1* | 7/2018 | Butler | .............. | G06K 7/10198 |

FOREIGN PATENT DOCUMENTS

| | | |
|---|---|---|
| KR | 10-2014-0141201 A | 12/2014 |
| KR | 10-2016-0064477 A | 6/2016 |
| KR | 10-2016-0066877 A | 6/2016 |
| KR | 10-2016-0087635 A | 7/2016 |
| KR | 10-1666519 B | 10/2016 |

* cited by examiner

| CARGO ID | TYPE OF CARGO | CARGO VEHICLE | ROAD | TIME (SEASON) | DRIVER | TRUST INDEX |
|---|---|---|---|---|---|---|

METHOD OF PROCESSING LOGISTICS INFORMATION, LOGISTICS INFORMATION PROCESSING SERVER USING THE SAME, AND LOGISTICS MANAGING APPARATUS USING THE SAME

CROSS-REFERENCE TO RELATED APPLICATIONS

This application claims priority to Korean Patent Application No. 10-2016-0156798, filed Nov. 23, 2016, and No. 10-2017-0152856, filed Nov. 16, 2017, in the Korean Intellectual Property Office (KIPO), the entire contents of which are hereby incorporated by reference.

BACKGROUND

1. Technical Field

Example embodiments of the present invention relate in general to the field of a method of processing logistics information, a logistics information processing server using the same, and a logistics managing apparatus using the same, and more particularly, to a method of processing logistics information for providing an open logistics service, a logistics information processing server using the same, and a logistics managing apparatus using the same.

2. Description of Related Art

With an explosive increase in various types of cargo due to industrial development, there has been a need for more sophisticated management of cargo according to the types of cargo in a cargo transportation process, and as a result of the emergence of various cargo companies, there has been a demand for a service that provides a shipper with reliability of each cargo company.

In addition, with the development of transportation and e-commerce logistics and expansion of other industries, the number of cargoes has increased sharply (e.g., Korean domestic parcel volume of 2014: about 16.1 billion boxes (logistics newspaper, Sep. 15, 2014), which not only requires transportation technologies that take into account the characteristics of various types of cargo, but also logistics systems that minimize the influence of environmental factors exerted on various types of cargo during transportation (vibration, humidity, temperature, impact, and the like). To this end, logistics-related organizations are developing automated logistics technologies, such as a cold chain technology to secure the safety of agricultural and marine products. However, studies on the internal damage occurring in cargo during transportation have not been conducted yet, so there is a limitation in preventing the quality of the cargo from being degraded.

SUMMARY

Accordingly, embodiments of the present disclosure provide a logistics information processing server interworking with at least one cargo storage device via a network.

Accordingly, embodiments of the present disclosure also provide a logistics managing apparatus interworking with at least one cargo storage device via a network.

Accordingly, embodiments of the present disclosure also provide a logistics information processing method in a logistics information processing server interworking with at least one cargo storage device via a network.

In order to achieve the objective of the present disclosure, a logistics information processing server may comprise a data processor configured to receive environment sensing data collected from at least one environmental sensor disposed in a cargo storage device in which at least one cargo is stored and cargo related information collected from a cargo tag attached to the at least one cargo, and to perform processing by classifying the environment sensing data and the cargo related data into cargo storage environment data, cargo information, and transportation environment information according to data attributes; and a logistics trust index generator configured to generate a logistics trust index indicating a degree of influence exerted on the quality of the cargo from the cargo storage environment data, cargo information, and transportation environment information output by the data processor.

The logistics trust index generator generates logistics management data including the logistics trust index for the cargo and at least one piece of information among a cargo number of the cargo, a type of the cargo, a road, a time, a season, and a name of a driver.

The logistics trust index is variably set according to a type of a cargo storage environment parameter extracted from the cargo storage environment data and a transportation time of the cargo.

The cargo storage environment parameter includes a parameter related to at least one among temperature, humidity, vibration, and atmospheric pressure inside the cargo storage device.

The logistics trust index is calculated by comparing a cargo storage environment parameter extracted from the cargo storage environment data with an environmental parameter durability range.

When the cargo storage environment parameter is included in the environmental parameter durability range, the logistics trust index is set as a maximum value and when the cargo storage environment parameter deviates from the environmental parameter durability range, the logistics trust index is reduced from the maximum value by an offset value that is set depending on an extent to which the cargo storage environment parameter deviates from the environmental parameter durability range.

In order to achieve the objective of the present disclosure, an logistics managing apparatus may comprise a logistics information processing server configured to receive environment sensing data collected from at least one environmental sensor disposed in a cargo storage device in which at least one cargo is stored and cargo related information collected from a cargo tag attached to the at least one cargo, classify the environment sensing data and the cargo related data into cargo storage environment data, cargo information, and transportation environment information according to data attributes, and generate a logistics trust index indicating a degree of an influence exerted on the quality of the cargo from the cargo storage environment data, cargo information, and transportation environment information; and a service management server configured to generate environmental control data on the basis of the logistics trust index, transmit the generated environmental control data to the at least one logistics storage device, and provide a recommendation service for logistics management according to the logistics trust index for each product.

The environmental control data includes at least one of air conditioner control data and ventilator control data.

The recommendation service for logistics management includes at least one of a logistics-specific packaging guide, a cargo-specific logistics recommendation guide, and a road-specific maintenance recommendation guide.

The logistics information processing server generates the logistics management data including the logistics trust index for the cargo and at least one piece of information among a cargo number of the cargo, a type of the cargo, a road, a time, a season, and a name of a driver.

The logistics trust index is variably set according to a type of a cargo storage environment parameter extracted from the cargo storage environment data and a transportation time of the cargo.

The cargo storage environment parameter includes a parameter related to at least one among temperature, humidity, vibration, and atmospheric pressure inside the cargo storage device.

The logistics trust index is calculated by comparing a cargo storage environment parameter extracted from the cargo storage environment data with an environmental parameter durability range.

When the cargo storage environment parameter is included in the environmental parameter durability range, the logistics trust index is set as a maximum value and when the cargo storage environment parameter deviates from the environmental parameter durability range, the logistics trust index is reduced from the maximum value by an offset value that is set depending on an extent to which the cargo storage environment parameter deviates from the environmental parameter durability range.

In order to achieve the objective of the present disclosure, a logistics information processing method may comprise receiving environment sensing data collected from at least one environmental sensor disposed in the cargo storage device in which at least one cargo is stored and cargo related information collected from a cargo tag attached to the at least one cargo; classifying and processing the environment sensing data and the cargo related data into cargo storage environment data, cargo information, and transportation environment information according to data attributes; and generating a logistics trust index indicating a degree of an influence exerted on the quality of the cargo from the cargo storage environment data, cargo information, and transportation environment information.

The generating of the logistics trust index includes generating logistics management data including the logistics trust index for the cargo and at least one piece of information among a cargo number of the cargo, a type of the cargo, a road, a time, a season, and a name of a driver.

The logistics trust index is variably set according to a type of a cargo storage environment parameter extracted from the cargo storage environment data and a transportation time of the cargo.

The cargo storage environment parameter includes a parameter related to at least one among temperature, humidity, vibration, and atmospheric pressure inside the cargo storage device.

The logistics trust index is calculated by comparing a cargo storage environment parameter extracted from the cargo storage environment data with an environmental parameter durability range.

The logistics trust index is set as a maximum value when the cargo storage environment parameter is included in the environmental parameter durability range and the logistics trust index is reduced from the maximum value by an offset value that is set depending on an extent to which the cargo storage environment parameter deviates from the environmental parameter durability range when the cargo storage environment parameter deviates from the environmental parameter durability range.

The embodiments of the present disclosure may prevent environmental factors such as vibration, humidity, temperature, shock, and the like experienced by each cargo during cargo transportation form harming the quality of the cargo, thus preventing cargo from being deteriorated.

Also, the embodiments of the present disclosure may provide an effect of inducing regular delivery of cargo by generating and providing the reliability for each cargo, the reliability of the cargo car, and the reliability for the cargo company.

In addition, by recommending various shipping companies and delivery methods to the shippers, it is possible to expect the improvement of the quality of the logistics service through inducing competition in the logistics market.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention provide a method capable of safe delivery of cargo and reliability of cargo vehicles and cargo companies, and further enabling a cargo-specific customized delivery service by disposing or installing an environmental sensor on a cargo storage device (for example, a cargo vehicle), and attaching a tag to each cargo so as to monitor a change in a physical environment (e.g., vibration, temperature, humidity, atmospheric pressure, and the like) experienced during the storage or transportation of the cargo in real time and track a movement path of the cargo such that a logistics trust index indicating the degree to which the cargo is safely transported to a destination is generated and provided.

Example embodiments of the present invention also provide a technology of configuring a logistics trust platform in which a sensor and a tag are attached to a cargo vehicle and a cargo such that environmental parameters are monitored in real time and a logistics trust index is generated.

Hereinafter, exemplary embodiments of the present invention will be described in detail with reference to the accompanying drawings.

Figure 1:
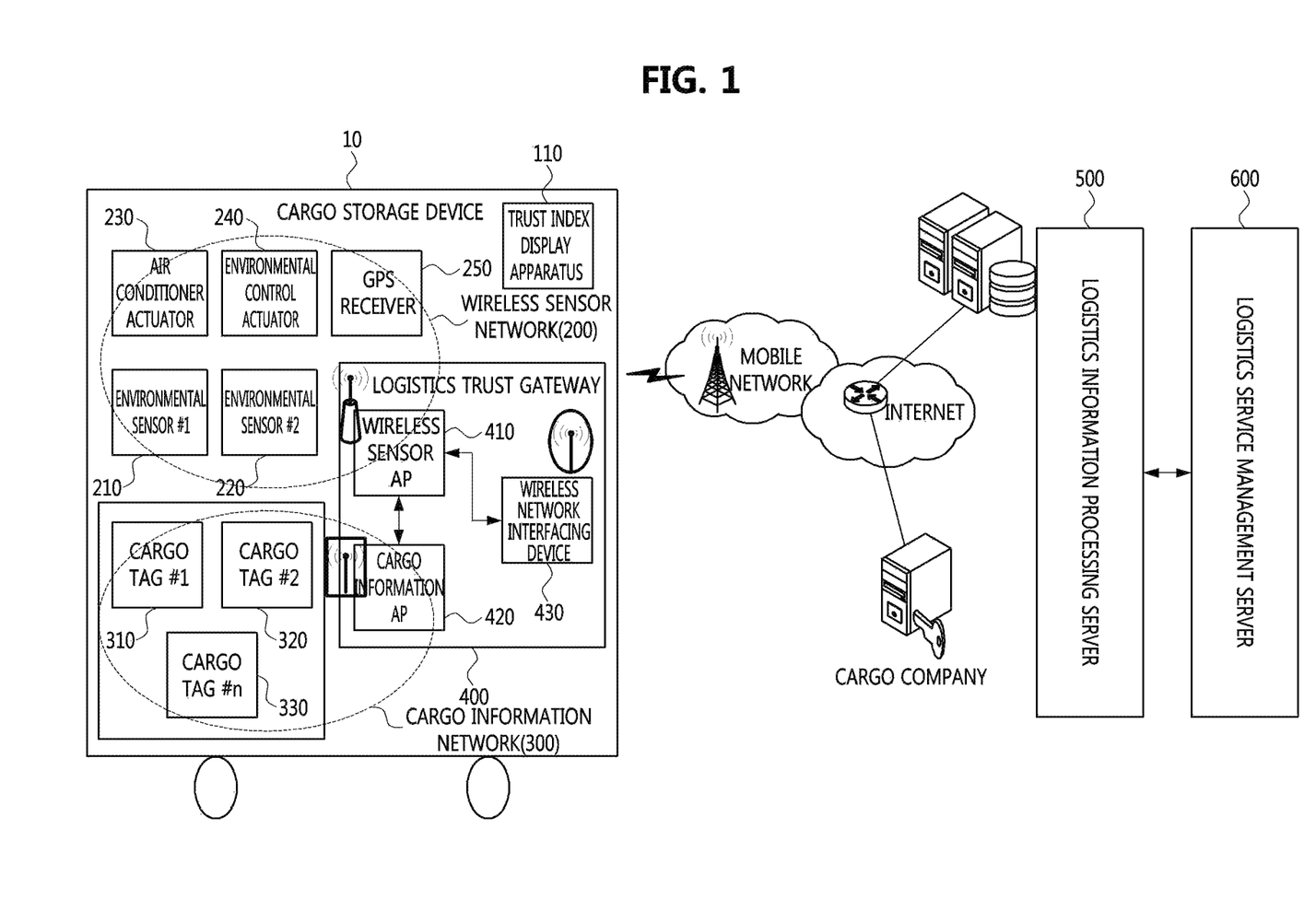
FIG. 1 is a schematic diagram illustrating a configuration of a smart logistics network according to an example embodiment of the present invention.

FIG. 1 is a schematic diagram illustrating a configuration of a smart logistics network according to an example embodiment of the present invention.

The present invention is provided to construct an optimum logistics environment by monitoring the amount of change in a physical environment experienced by a cargo during storage or transportation, tracking a transportation route of the type of cargo and generating and providing a logistics trust index indicating a degree of influence exerted on the quality of the cargo.

The logistics trust index according to the present invention may be used as an index for monitoring an environment change experienced by cargo during transportation and estimating the influence exerted on the durability of the cargo.

To this end, the smart logistics network according to the example embodiment of the present invention includes at least one cargo storage device 10, a logistics information processing server 500 connected to the cargo storage device 10 via a network, and a logistics service management server 600. The cargo storage device 10 and the logistics information processing server 500 may be connected to each other via wired and wireless networks, such as a mobile communication network, the Internet, etc. In addition, a cargo company may be connected to the at least one cargo storage device 10, the logistics information processing server 500, and the logistics service management server 600 via a network.

In FIG. 1, although the logistics information processing server 500 and the logistics service management server 600 are shown as separate hardware or components, the functions of the two entities may be integrated as one unit or component if necessary. In this specification, an apparatus having a combination of concepts of the logistics information processing server 500 and the logistics service management server 600 may be referred to as a logistics managing apparatus.

The logistics managing apparatus according to the embodiment of the present invention, interworking with at least one cargo storage device via a network, includes: a logistics information processing server configured to receive environment sensing data collected from at least one environmental sensor disposed in the cargo storage device in which at least one cargo is stored and cargo related information collected from a cargo tag attached to the at least one cargo, to classify the environment sensing data and the cargo related data into cargo storage environment data, cargo information, and transportation environment information according to data attributes, and to generate a logistics trust index indicating a degree of influence exerted on the quality of the cargo from the cargo storage environment data, cargo information, and transportation environment information; and a service management server configured to generate environmental control data on the basis of the logistics trust index, to transmit the generated environmental control data to the at least one cargo storage device, and to provide a recommendation service for logistics management according to the logistics trust index for each product.

Here, the cargo storage device includes a cargo vehicle, a cargo warehouse, and a cargo container. In other others, the cargo storage device according to the present invention may refer to a space, a place, or a device capable of being moved in which at least one cargo is stored or kept for a predetermined period of time.

The smart logistics network shown in FIG. 1 is illustrated under the assumption that the cargo storage device is a cargo vehicle. The cargo storage device 10 may have a wireless sensor network 200 and a cargo information network 300.

The wireless sensor network 200 may have one or more environment sensors 210 and 220 to obtain various types of environmental information, such as temperature, humidity, vibration, and atmospheric pressure inside the cargo vehicle. In addition, the wireless sensor network 200 may have an on-vehicle air conditioner actuator 230 or an environmental control actuator 240 for controlling an environmental device, such as a ventilator, and a global positioning system (GPS) receiver 250. The cargo information network 300 includes at least one cargo tag in which the kinds and attributes of the cargos are recorded, and the cargo tag may be attached to a cargo related to the cargo information or the packaging of the cargo.

Meanwhile, a logistics trust gateway 400 includes a wireless sensor access point (AP) 410 disposed in the wireless sensor network 200 to obtain at least one piece of environmental sensor information, a cargo information AP 420 allowing information to be written on or read from the cargo tag, and a wireless network interfacing device 430 for interworking with an external commercial mobile network.

The logistics trust gateway 400 gathers cargo information collected through the cargo information network 300 and information sensed by the environmental sensor and collected through the wireless sensor network 200 and transmits the gathered information to the logistics information processing server 500 through the network including the mobile network and the Internet.

Furthermore, the trust index display apparatus 110 may be attached to a cargo stored in the cargo storage device 10. The trust index display apparatus 110 may be attached to the cargo and display the trust index of the cargo.

The logistics information processing server 500 may include a logistics trust platform according to the present invention.

The logistics information processing server 500 includes a sensing information classifier configured to process data sensed by and collected from the cargo storage device 10, a cargo storage environment data processor configured to process information about an environment inside the cargo storage device 10 in which cargo is loaded, for example, the temperature, the humidity, the vibration, and the atmospheric pressure inside the cargo storage device 10, a cargo information processor configured to process the type of cargo and safety information and quality information required during transportation of cargo, a transportation environment information processor configured to process information about the type and slope of a road, a climate, and the like, and a logistics trust index generator.

The logistics service management server 600 may include an application service platform according to the present invention.

The logistics service management server 600 may include a logistics storage environment controller configured to control a cooling device and a blower of an apparatus in which a cargo is stored, e.g., a cargo vehicle on which a cargo is loaded, and a recommendation service generator configured to recommend various application services, delivery companies, and delivery methods on the basis of a logistics trust index.

Accordingly, the logistics service management server 600 may be used and managed by a manager of a cargo company or a shipper, and depending on use or need, may be disposed in a remote site distant from the logistics information processing server 500 as a separate element, or may be combined with the logistics information processing server 500 with respect to hardware and disposed as a single entity.

Figure 2:
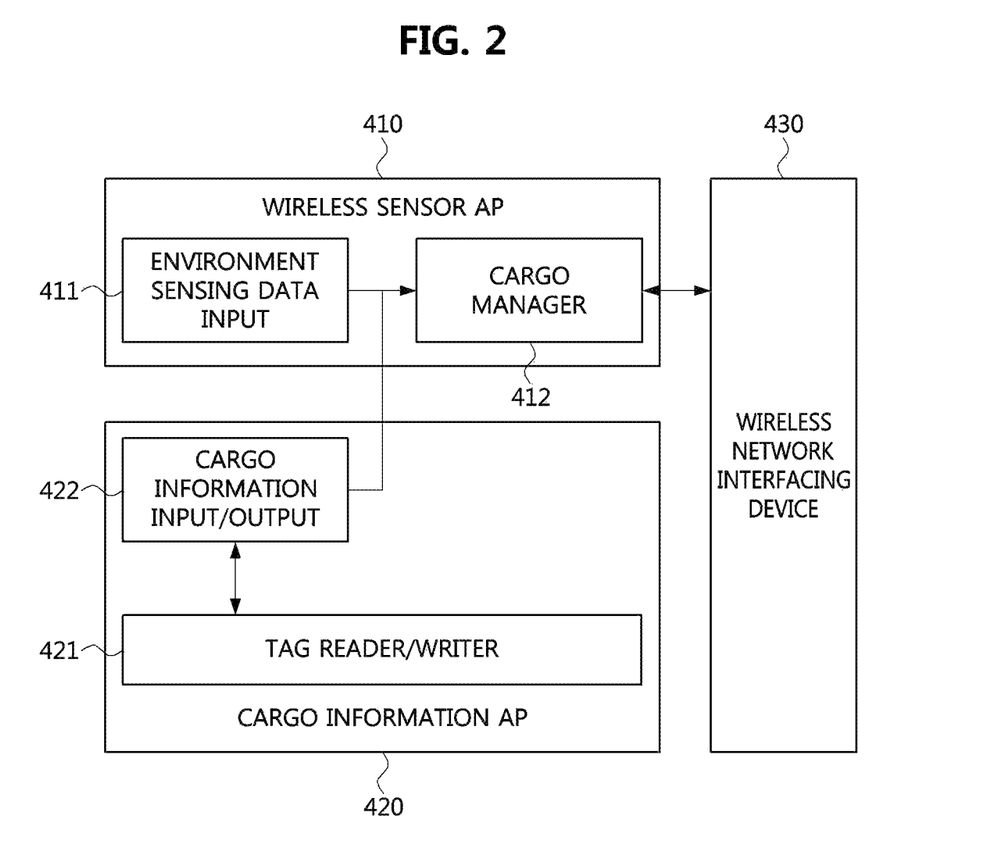
FIG. 2 is a block diagram illustrating a configuration of a logistics trust gateway device according to an example embodiment of the present invention.

FIG. 2 is a block diagram illustrating a configuration of a logistics trust gateway device according to an example embodiment of the present invention.

Referring to FIG. 2, the logistics trust gateway device according to the example embodiment of the present invention may include the wireless sensor AP 410, the cargo information AP 420, and the wireless network interfacing device 430.

The wireless sensor AP 410 may include an environment sensing data input 411 and a cargo manager 412. The environment sensing data input 411 reads environmental data inside the cargo storage device, such as temperature, humidity, atmospheric pressure, and the like.

The cargo manager 412 gathers and manages environment sensing data received from the environment sensing data input 411 and information about a cargo stored in the cargo storage device 10 received from the cargo information AP 420, and transmits the gathered information to the network via the wireless network interfacing device 430. In addition, the cargo manager 412 serves to receive an environment control command input from the wireless network interfacing device 430, determine an actuator related to the corresponding environment control command, and transmit the environment control command to the determined actuator.

The cargo information AP 420 may include a tag reader/writer 421 and a cargo information input/output 422. The tag reader/writer 421 reads a tag attached to a cargo, and records the type and characteristics of a cargo on the tag. The cargo information input/output 422 processes information to be recorded on or read from a cargo tag in association with the cargo manager 412 in the wireless sensor AP 410.

The wireless network interfacing device 430 transmits data input from the wireless sensor AP 410 and the cargo information AP 420 to the logistics information processing server 500. The wireless network interfacing device 430 may receive an environment control command input from the logistics service management server 600, the logistics information processing server 500 and the network and transmit the received environment control command to the wireless sensor AP 410.

Figure 3:
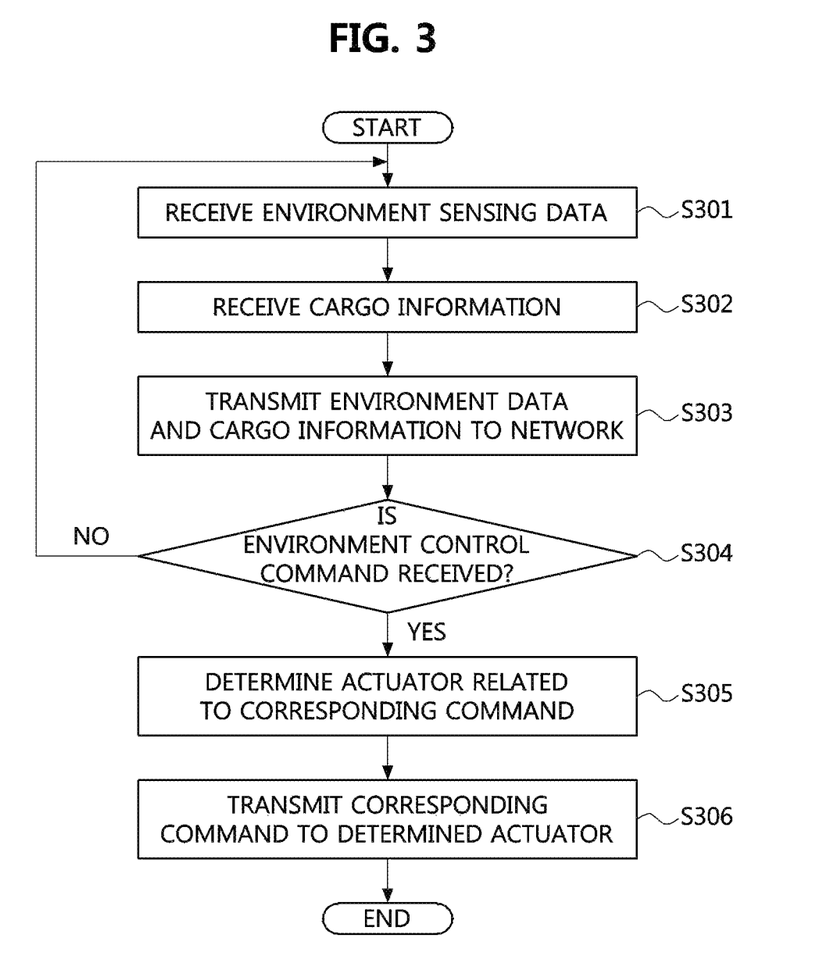
FIG. 3 is a flowchart showing operations of a logistics managing method performed by the logistics trust gateway device according to the example embodiment of the present invention.

FIG. 3 is a flowchart showing operations of a logistics managing method performed by the logistics trust gateway device according to the example embodiment of the present invention.

Referring to FIG. 3, the logistics trust gateway receives environment sensing data through a wireless sensor network in an environment in which the cargo storage device is located (S301). In addition, the logistics trust gateway receives cargo information from cargo tags attached to a plurality of cargos in the cargo storage device (S302). The logistics trust gateway transmits the collected environment data and cargo information to the network (S303). Then, upon receiving an environment control command from the logistics information processing server through the network (S304), the logistics trust gateway determines an actuator related to the corresponding command (S305), and transmits the corresponding command to the determined actuator (S306).

The actuator having received the corresponding command performs an operation instructed by the received environment control command, so that the environment inside the cargo storage device is adjusted to suit the cargo.

Figure 4:
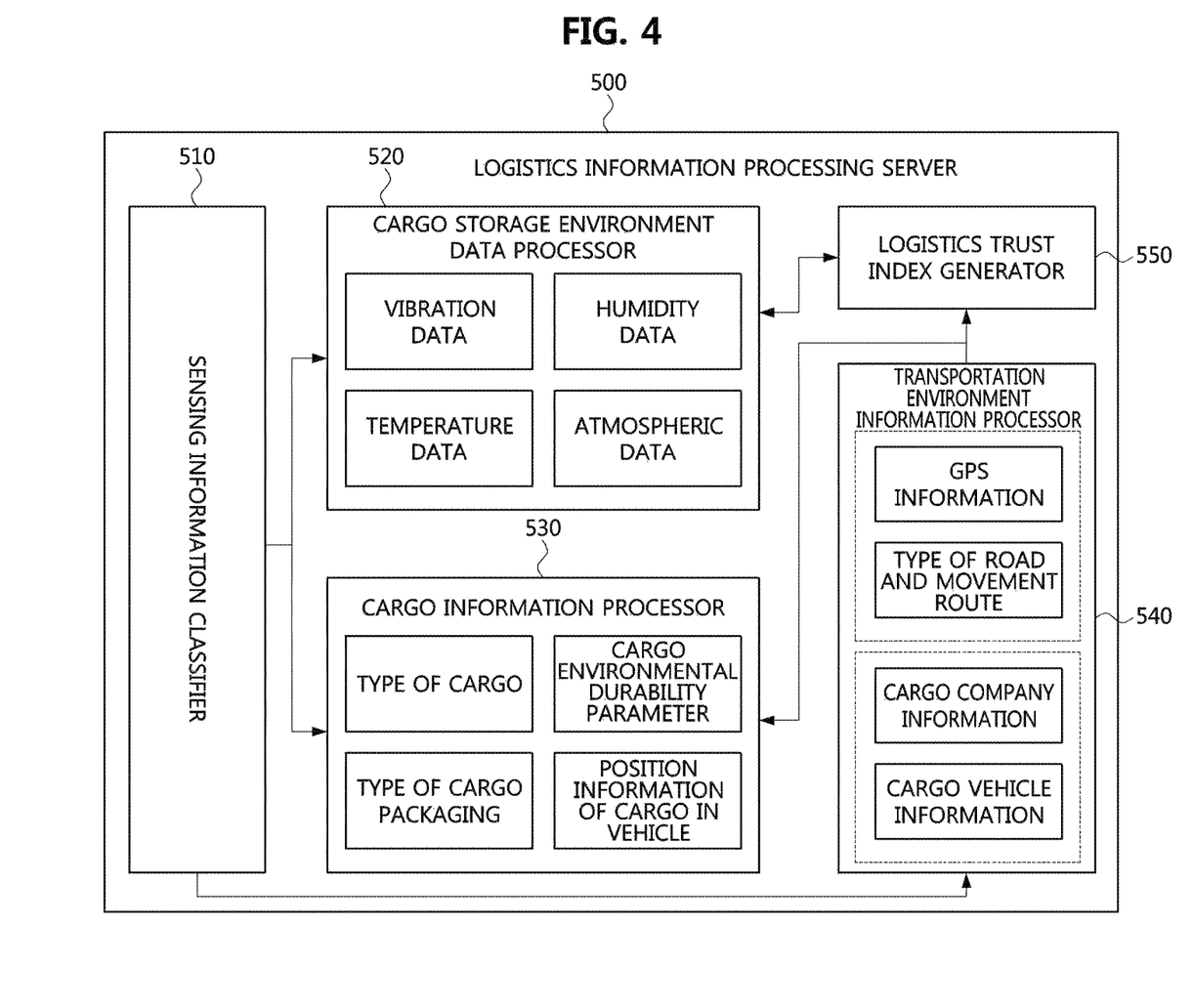
FIG. 4 is a block diagram illustrating a configuration of a logistics information processing server according to an example embodiment of the present invention.

FIG. 4 is a block diagram illustrating a configuration of a logistics information processing server according to an example embodiment of the present invention.

A logistics trust platform according to the present invention may be constituted by the logistics information processing server shown in FIG. 4. Here, the logistics trust platform may refer to a platform in which environmental parameters collected from the cargo storage device and the cargo are monitored in real time and a logistics trust index is generated.

The logistics information processing server, while interworking with at least one cargo storage device via a network, includes: a data processor configured to receive environment sensing data collected from at least one environmental sensor disposed in a cargo storage device in which at least one cargo is stored and cargo related information collected from a cargo tag attached to the at least one cargo, and to perform processing by classifying the environment sensing data and the cargo related data into cargo storage environment data, cargo information, and transportation environment information according to data attributes; and a logistics trust index generator configured to generate a logistics trust index indicating a degree of influence exerted on the quality of the cargo from the cargo storage environment data, cargo information and transportation environment information transportation that are output by the data processor.

In more detail, the logistics information processing server 500 includes a sensing information classifier 510, a cargo storage environment data processor 520, a cargo information processor 530, a transportation environment information processor 540, and a logistics trust index generator 550.

Meanwhile, the sensing information classifier 510, the cargo storage environment data processor 520, the cargo information processor 530, and the transportation environment information processor 540 may be combined with respect to functions thereof as a single component. The combined component may be referred to a data processor.

The sensing information classifier 510 receives data input via the logistics trust gateway device and a network from the cargo storage device 10. The data received by the sensing information classifier 510 from the cargo storage device 10 may include cargo storage environment data, cargo information, and transportation environment information.

The sensing information classifier 510 classifies the data input from the cargo storage device 10 into cargo storage environment data, cargo information, and transportation environment information according to attributes. The cargo storage environment data, cargo information, and the transportation environment information among the classified data are transmitted to the cargo storage environment data processor 520, the cargo information processor 530, and the transportation environment information processor 540, respectively, to be processed therein.

The cargo storage environment data processor 520 receives cargo storage environment data, such as vibration data, humidity data, temperature data, atmospheric pressure data, and the like that are input from the cargo storage device, processes the received cargo storage environment data, and transmits the processed cargo storage environment data to the transportation environment information processor 540.

The cargo information processor 530 receives information about the type of cargo stored or kept in the cargo storage device, the type of cargo packaging, an environmental durability parameter of each cargo, position information of a cargo in the cargo vehicle, and the like, processes the received information, and transmits the processed information to the transportation environment information processor 540.

The transportation environment information processed by the transportation environment information processor 540 may include GPS information related to the cargo vehicle, cargo company related information, and information about the cargo vehicle. The transportation environment information processor 540, for example, may determine the type of a road and a movement route of a vehicle, by using the GPS information, such as the position and speed of the cargo vehicle being moved, and transmit the determined type of the road and movement route of the vehicle to the logistics trust index generator 550. In addition, the transportation environment information processor 540 transmits cargo company information and cargo vehicle information received from the cargo company to the logistics trust index generator 550.

The logistics trust index generator 550 receives the cargo storage environment data, the cargo information, and the transportation environment information and generates a logistics trust index which indicates the degree of influence exerted on the quality of the cargo. Herein, the logistics trust index may be used as an index for monitoring an environment change experienced by the cargo during transportation and estimating the influence exerted on the durability of a cargo.

Figure 5:
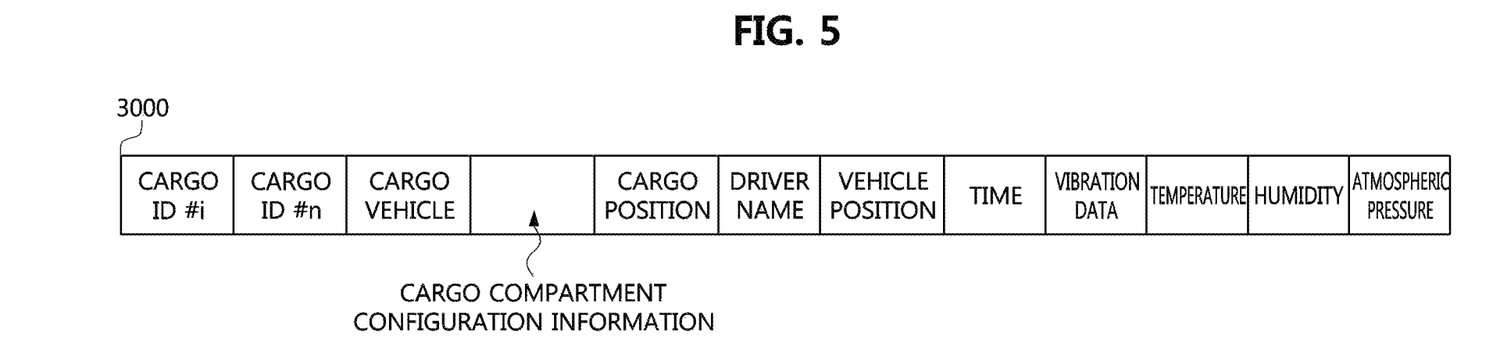
FIG. 5 illustrates a structure of cargo information data according to an example embodiment of the present invention.

FIG. 5 illustrates a structure of cargo information data according to an example embodiment of the present invention.

The cargo information data shown in FIG. 5 includes sensing data that is transmitted from a space or place having a certain cargo which is loaded in a certain space, such as a cargo vehicle, a cargo container, and the like, and the cargo information data represents a structure of data being input into the logistics trust index generator.

Referring to FIG. 5, the cargo information data according to the present invention may include a cargo number (cargo ID or cargo No.), the number of the cargo vehicle delivering a cargo, a cargo compartment configuration information of the cargo vehicle, the position of a cargo in the cargo vehicle, a driver's name, position and time information of the cargo vehicle received from a GPS installed in the cargo vehicle, vibration data, temperature data, and information related to humidity and atmospheric pressure. Here, when a plurality of items of cargos are stored in one cargo compartment of one cargo vehicle, a single piece of cargo information data may include a plurality of cargo numbers.

Figure 6:
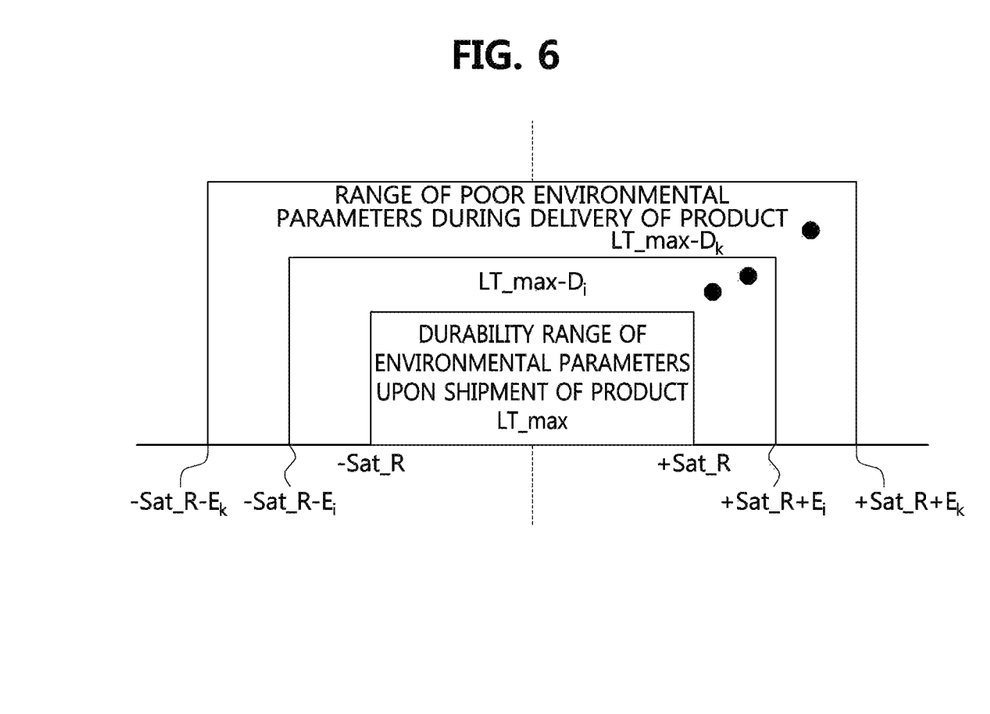
FIG. 6 is a conceptual diagram of a logistics trust index according to an example embodiment of the present invention.

FIG. 6 is a conceptual diagram of a logistics trust index according to an example embodiment of the present invention.

FIG. 6 is a diagram for describing parameters that are considered to generate the logistics trust index, and a concept in which the logistics trust index is generated using the parameters.

The parameters considered to generate the logistics trust index may include environmental parameters experienced by cargo during transportation. All products need to implement original functions and performance thereof regardless of an environment experienced by the product, and the condition may be defined as a range of environmental parameters that is ensured upon shipment. The environmental parameters considered in relation to the range of environmental parameters may include temperature, humidity, vibration, atmospheric pressure, and the like.

Referring to FIG. 6, the range of environmental parameters in which the performance and function of a product are ensured is defined as {−Sat_R to +Sat_R}. When it is determined that a product is provided within the range of environmental parameters in which the performance and function of a product during transportation are ensured, a maximum value LT_max is assigned as the logistics trust index for the corresponding product. When the product is exposed to an environment which deviates from the range of environmental parameters in which the performance and function of a product during transportation are ensured, the logistics trust index for the product is obtained by subtracting the degree of deviation from the range of environmental parameters (indicated with a symbol Ei in FIG. 6) from LT_max. That is, when the transportation environmental parameter value is included in a range of {−Sat_R−Ei to +Sat_R+Ei}, the logistics trust index may be a value of LT_max−Di. Di represents a logistics trust offset value, which is reduced from LT_max and corresponds to Ei.

The logistics trust index value according to the present invention is generated by the Equation 1 in consideration of a transportation time of the cargo and a type of an environmental parameter.

$$LT = \sum_{j=1}^{m} W_j \cdot \frac{\sum_{i=1}^{k} \{LT\_max - D_i\} \cdot T_i}{D\_T}$$ [Equation 1]

In Equation 1, LT represents a logistics trust index, Wj is a weight of an environmental parameter j, LT_max is a maximum value of a logistics trust index, Di is a logistics trust offset value reduced from LT_max, Ti is an observation time slot for updating a logistics trust index, and D_T is a total logistics transportation time.

As shown in Equation 1, the logistics trust index according to the present invention is influenced by the type (or kind) of an environmental parameter, such as, temperature, humidity, vibration, atmospheric pressure, and the logistics transportation time. In addition, an influence of a particular environmental parameter exerted on the logistics trust index may be greater than those of other environmental parameters depending on the type of a product. In this case, regarding the corresponding product, the corresponding parameter may be assigned a greater weight. For example, with regard to fresh food sensitive to the temperature, a temperature parameter may be assigned a high weight value. In addition, with regard to a product sensitive to vibration, such as glass product, a vibration parameter may be assigned a high weight value when compared to other types of products.

Figure 7:
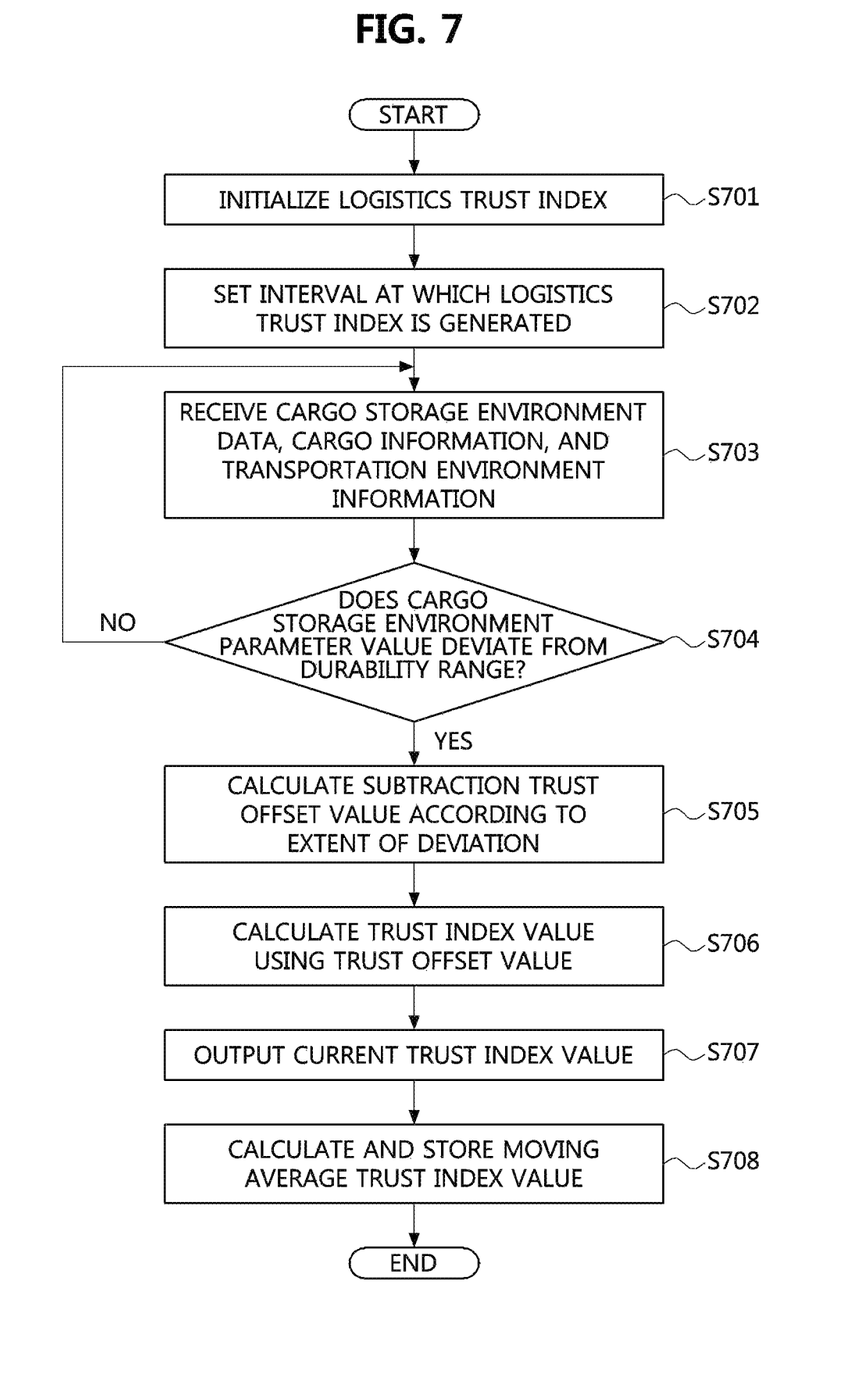
FIG. 7 is a flowchart showing operations of a logistics trust index generating method according to an example embodiment of the present invention.

FIG. 7 is a flowchart showing operations of a logistics trust index generating method according to an example embodiment of the present invention An object performing the logistics trust index generating method may be the logistics information processing server or the logistics managing apparatus. However, the present invention is not limited thereto.

In order to generate a logistics trust index, a logistics trust index value is initialized (S701), and a time slot T_eval that is an interval at which a logistics trust index is generated is set (S702). For example, an initial value of the logistics trust index may be set to LT=100 and LT_avg=0.

Then, the cargo storage environment data, cargo information, and transportation environment information classified from the overall data or information collected from the logistics storage device are received (S703).

When the cargo storage environment data, cargo information, and transportation environment information are obtained, whether a cargo storage environment parameter value deviates from a durability range of the cargo is determined (S704). The cargo storage environment parameter may be extracted from the cargo storage environment data.

When the input cargo storage environment parameter value does not deviate from the durability range, (NO in operation S704), a previous trust index value is output. When the input cargo storage environment parameter value deviates from the durability range, a deviation value is calculated, and a trust offset value T_off is calculated from the deviation value (S705). The trust offset value may correspond to the logistics trust offset value described above with reference to Equation 1, and may be determined by performing a linear or non-linear comparison with a value in a predetermined range.

When the trust offset value is calculated, the trust offset value is subtracted from the initial LT value, and the weight value Wj is applied to a value obtained by subtracting the trust offset value from the initial LT value, so that a trust index value at a current point of time is calculated and output (S706 and S707). That is, the trust index value is calculated by an equation $LT=W_i*(LT-D_i)$. When the trust index value at the current point of time is calculated, a moving average value LT_avg is calculated from trust index values previously stored in a cumulative manner and the trust index value at the current point of time (S708).

Meanwhile, a method of processing logistics information according to an example embodiment of the present invention may include processing logistics information using the method of generating a logistics trust index described above. That is, the method of processing logistics information according to the example embodiment of the present invention includes receiving environment sensing data collected from at least one environmental sensor disposed in a cargo storage device in which at least one cargo is stored and cargo related information collected from a cargo tag attached to the at least one cargo; performing processing by classifying the environment sensing data and the cargo related data into cargo storage environment data, cargo information, and transportation environment information according to data attributes; and generating a logistics trust index indicating a degree of influence exerted on the quality of the cargo from the cargo storage environment data, cargo information, and transportation environment information output by the data processor.

Figure 8:
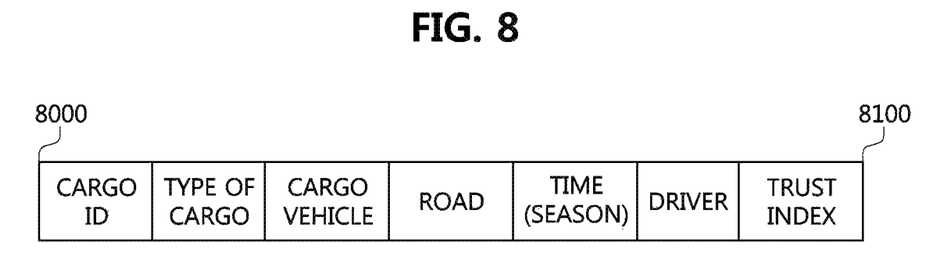
FIG. 8 is a diagram illustrating a structure of logistics management data including the logistics trust index according to the example embodiment of the present invention.

FIG. 8 is a diagram illustrating a structure of logistics management data including the logistics trust index according to the example embodiment of the present invention.

The logistics trust index generated by the logistics trust index generator 550 is included in logistics management data and transmitted to the logistics service management server 600. FIG. 8 shows a structure of the logistics management data generated by the logistics trust index generator 550 and transmitted to the logistics service management server 600.

Referring to FIG. 8, logistics management data 8000 according to the example embodiment of the present invention includes a cargo number, a type of cargo, a road, a time and a season, a driver's name, and a logistics trust index 8100 of a cargo.

Figure 9:
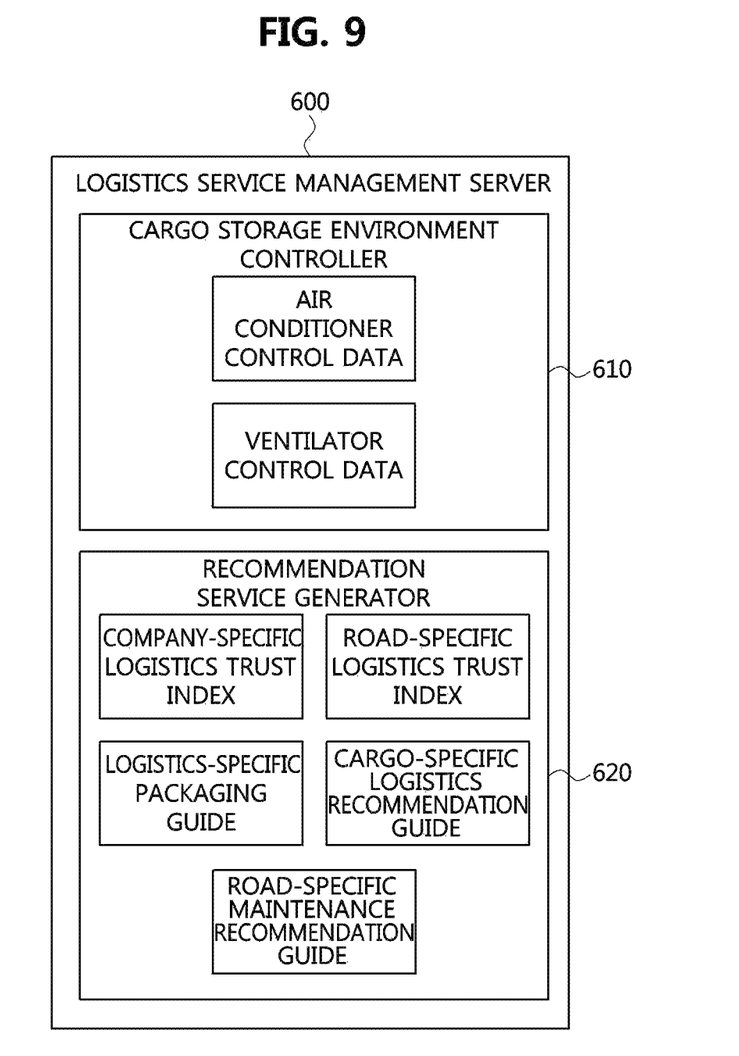
FIG. 9 is a block diagram illustrating a configuration of a logistics service management server according to an example embodiment of the present invention.

FIG. 9 is a block diagram illustrating a configuration of a logistics service management server according to an example embodiment of the present invention.

An application service platform according to the example embodiment of the present invention may be constituted by the logistics service management server 600 shown in FIG. 9.

Referring to FIG. 9, the logistics service management server 600 according to the example embodiment of the present invention may include a cargo storage environment controller 610 and a recommendation service generator 620.

The cargo storage environment controller 610 may monitor an environmental parameter value inside a cargo storage device and generate air conditioner control data for controlling an air conditioner or ventilator control data for controlling a ventilator as desired. The generated control data is transmitted to the cargo storage device by passing through the logistics trust gateway 400 via a network, and is used to control an environment inside the cargo storage device through the air conditioner actuator, the environmental control actuator, and the like located in the wireless sensor network.

The recommendation service generator 620 may generate and manage a company-specific logistics trust index or a road-specific logistics trust index on the basis of a logistics trust index value calculated for each product. The recommendation service generator 620 may generate and manage a logistics-specific packaging guide, a cargo-specific logistics recommendation guide, and a road-specific maintenance recommendation guide, and provide a user with the logistics-specific packaging guide, the cargo-specific logistics recommendation guide, and the road-specific maintenance recommendation guide.

Figure 10:
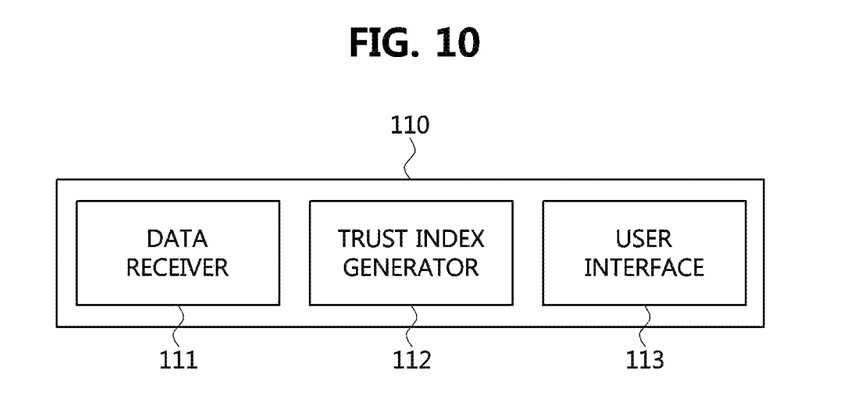
FIG. 10 is a block diagram illustrating a configuration of a trust index display apparatus according to an example embodiment of the present invention.

FIG. 10 is a block diagram illustrating a configuration of a trust index display apparatus according to an example embodiment of the present invention.

The trust index display apparatus 110 according to an embodiment of the present invention may include a data receiver 111, a trust index generator 112, and a user interface 113.

The data receiver 111 senses data related to the environment in the cargo storage device from the wireless sensor network 200 or obtains data and vehicle information related to the environment in the cargo (product) storage device from the wireless sensor AP 410 in connection with the wireless sensor AP 410 in the logistics trust gateway 400. That is, the data receiver 111 may acquire various environmental information data such as temperature, humidity, vibration, air pressure, and cargo information in the cargo vehicle or the storage device.

The trust index generator 112 generates the logistics trust index using the temperature data, the humidity data, the vibration data, the atmospheric pressure data, and the cargo information acquired through the data receiver 111. The trust index generator 112 may calculate the logistics trust index cumulatively and calculate the logistics trust index using, for example, a CDF (cumulative distribution function).

A detailed method of generating the logistics trust index may be the same as the method described with Equation 1. As shown in Equation 1 described above, the logistics trust index according to the present invention is influenced by the type (or kind) of an environmental parameter, such as, temperature, humidity, vibration, atmospheric pressure, and the logistics transportation time. In addition, an influence of a particular environmental parameter exerted on the logistics trust index may be greater than those of other environmental parameters depending on the type of a product. In this case, regarding the corresponding product, the corresponding parameter may be assigned a greater weight. For example, with regard to fresh food sensitive to the temperature, a temperature parameter may be assigned a high weight value. In addition, with regard to a product sensitive to vibration, such as glass product, a vibration parameter may be assigned a high weight value when compared to other types of products.

The trust index generator 112 may also classify the trust index indicated by the logistics trust index according to a predetermined level and provide information on the corresponding level to the user interface 113. The level may be divided into three levels, for example, upper, middle, and lower, and may be divided into five levels of 1-5, or ten levels of 1-10.

The user interface 113 may provide the corresponding information to the user using several display means according to the level of the logistics trust index provided from the trust index generator 112.

For example, the user interface 113 may be implemented including a Liquid Crystal Display (LCD), in which the color for the upper level logistics trust index is green, the color for the middle level logistics trust index is yellow, and the lower level logistics trust index is red. In addition, texts such as "good", "attention", and "trouble occurred" as well as several colors may be used in expressing information on the logistics trust index.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A logistics information processing server interworking with at least one cargo storage device via a network, the logistics information processing server comprising:
   a data processor receiving, via the network, environment sensing data generated by at least one environmental sensor included in the at least one cargo storage device in which at least one cargo is stored and receiving, via the network, cargo related data generated by a tag reader/writer and wirelessly read from a cargo tag attached to the at least one cargo, the tag reader/writer also being included in the at least one cargo storage device, the data processor processing and converting the environment sensing data and the cargo related data into cargo storage environment data, cargo information, and transportation environment information according to data attributes; and a logistics trust index generator generating a logistics trust index indicating a degree of influence exerted on the quality of the cargo from the cargo storage environment data, cargo information, and transportation environment information generated by the data processor, and a service management server generating environmental control data on the basis of the logistics trust index, transmitting the generated environmental control data to the at least one logistics storage device, and generating a recommendation service for logistics management according to the logistics trust index for each product, wherein the logistics trust index is calculated by comparing a cargo storage environment parameter extracted from the cargo storage environment data with an environmental parameter durability range, wherein, when the cargo storage environment parameter is included in the environmental parameter durability range, the logistics trust index is set as a maximum value, and wherein the logistics trust index is displayed through a trust index display apparatus in the at least one cargo storage device, such that the logistics trust index is generated by an Equation 1 in consideration of a transportation time of the cargo and a type of an environmental parameter, wherein $$LT = \sum_{j=1}^{m} W_j \cdot \frac{\sum_{i=2}^{k} \{LT\_max - D_i\} \cdot T_i}{D\_T}$$ [Equation 1]

in Equation 1, LT represents a logistics trust index, Wj is a weight of an environmental parameter j, LT_max is a maximum value of a logistics trust index, Di is a logistics trust offset value reduced from LT_max, Ti is an observation time slot for updating the logistics trust index, and D_T is a total logistics transportation time.

2. The logistics information processing server of claim 1, wherein the logistics trust index generator generates logistics management data including the logistics trust index for the cargo and at least one piece of information among a cargo number of the cargo, a type of the cargo, a road, a time, a season, and a name of a driver.

3. The logistics information processing server of claim 1, wherein the logistics trust index is variably set according to a type of a cargo storage environment parameter extracted from the cargo storage environment data and a transportation time of the cargo.

4. The logistics information processing server of claim 3, wherein the cargo storage environment parameter includes a parameter related to at least one among temperature, humidity, vibration, and atmospheric pressure inside the cargo storage device.

5. The logistics information processing server of claim 1, wherein, when the cargo storage environment parameter deviates from the environmental parameter durability range, the logistics trust index is reduced from the maximum value by an offset value that is set depending on an extent to which the cargo storage environment parameter deviates from the environmental parameter durability range.

6. A logistics managing system comprising:
at least one cargo storage device;
a logistics information processing server receiving, in real-time via the network, environment sensing data collected from at least one environmental sensor disposed in a remote cargo storage device in which at least one cargo is stored and receiving, in real-time via the network, cargo related data generated by a tag reader/writer and wirelessly read and collected from a cargo tag attached to the at least one cargo, the logistics information processing server classifying the environment sensing data and the cargo related data into cargo storage environment data, cargo information, and transportation environment information according to data attributes, and the logistics information processing server generating a logistics trust index indicating a degree of an influence exerted on the quality of the cargo from the cargo storage environment data, cargo information, and transportation environment information; and a service management server generating environmental control data on the basis of the logistics trust index, transmitting the generated environmental control data to the at least one logistics storage device, and generating a recommendation service for logistics management according to the logistics trust index for each product, wherein the logistics trust index is, calculated by comparing a cargo storage environment parameter extracted from the cargo storage environment data with an environmental parameter durability range, wherein, when the cargo storage environment parameter is included in the environmental parameter durability range, the logistics trust index is set as a maximum value, and wherein the logistics trust index is displayed through a trust index display apparatus in the at least one cargo storage device, such that the logistics trust index is generated by an Equation 1 in consideration of a transportation time of the cargo and a type of an environmental parameter, wherein $$LT = \sum_{j=1}^{m} W_j \cdot \frac{\sum_{i=2}^{k} \{LT\_max - D_i\} \cdot T_i}{D\_T}$$ [Equation 1]

in Equation 1, LT represents a logistics trust index, Wj is a weight of an environmental parameter j, LT_max is a maximum value of a logistics trust index, Di is a logistics trust offset value reduced from LT_max, Ti is an observation time slot for updating the logistics trust index, and D_T is a total logistics transportation time.

7. The logistics managing apparatus of claim 6, wherein the environmental control data includes at least one of air conditioner control data and ventilator control data.

8. The logistics managing apparatus of claim 6, wherein the recommendation service for logistics management includes at least one of a logistics-specific packaging guide, a cargo-specific logistics recommendation guide, and a road-specific maintenance recommendation guide.

9. The logistics managing apparatus of claim 6, wherein the logistics information processing server generates the logistics management data including the logistics trust index for the cargo and at least one piece of information among a cargo number of the cargo, a type of the cargo, a road, a time, a season, and a name of a driver.

10. The logistics managing apparatus of claim 6, wherein the logistics trust index is variably set according to a type of a cargo storage environment parameter extracted from the cargo storage environment data and a transportation time of the cargo.

11. The logistics managing apparatus of claim 10, wherein the cargo storage environment parameter includes a parameter related to at least one among temperature, humidity, vibration, and atmospheric pressure inside the cargo storage device.

12. The logistics managing apparatus of claim 6, wherein, when the cargo storage environment parameter deviates from the environmental parameter durability range, the logistics trust index is reduced from the maximum value by an offset value that is set depending on an extent to which the cargo storage environment parameter deviates from the environmental parameter durability range.

13. A logistics information processing method in a logistics information processing server interworking with at least one cargo storage device via a network, the logistics information processing method comprising:
receiving environment sensing data collected from at least one environmental sensor included in the cargo storage device in which at least one cargo is stored and receiving cargo related data generated by a tag reader/writer and wirelessly read and collected from a cargo tag attached to the at least one cargo, the tag reader/writer being included in the cargo storage device;
classifying and processing the environment sensing data and the cargo related data into cargo storage environment data, cargo information, and transportation environment information according to data attributes; and
generating a logistics trust index indicating a degree of an influence exerted on the quality of the cargo from the cargo storage environment data, cargo information, and transportation environment information,
wherein the logistics trust index is calculated by comparing a cargo storage environment parameter extracted from the cargo storage environment data with an environmental parameter durability range,
wherein, when the cargo storage environment parameter is included in the environmental parameter durability range, the logistics trust index is set as a maximum value, and
wherein the logistics trust index is displayed through a trust index display apparatus in the at least one cargo storage device, such that the logistics trust index is generated by an Equation 1 in consideration of a transportation time of the cargo and a type of an environmental parameter, wherein $$LT = \sum_{j=1}^{m} W_j \cdot \frac{\sum_{i=2}^{k} \{LT\_max - D_i\} \cdot T_i}{D\_T} \quad \text{[Equation 1]}$$

in Equation 1, LT represents a logistics trust index, Wj is a weight of an environmental parameter j, LT_max is a maximum value of a logistics trust index, Di is a logistics trust offset value reduced from LT_max, Ti is an observation time slot for updating the logistics trust index, and D_T is a total logistics transportation time, and
generating environmental control data on the basis of the logistics trust index, transmitting the generated environmental control data to at least one logistics storage device, and
generating a recommendation service for logistics management according to the logistics trust index for each product.

14. The logistics information processing method of claim 13, wherein the generating of the logistics trust index includes generating logistics management data including the logistics trust index for the cargo and at least one piece of information among a cargo number of the cargo, a type of the cargo, a road, a time, a season, and a name of a driver.

15. The logistics information processing method of claim 13, wherein the logistics trust index is variably set according to a type of a cargo storage environment parameter extracted from the cargo storage environment data and a transportation time of the cargo.

16. The logistics information processing method of claim 15, wherein the cargo storage environment parameter includes a parameter related to at least one among temperature, humidity, vibration, and atmospheric pressure inside the cargo storage device.

17. The logistics information processing method of claim 13, wherein, when the cargo storage environment parameter deviates from the environmental parameter durability range, the logistics trust index is reduced from the maximum value by an offset value that is set depending on an extent to which the cargo storage environment parameter deviates from the environmental parameter durability range.

* * * * *